Patented May 22, 1951

2,554,251

UNITED STATES PATENT OFFICE 2,554,251

ISOMERIZATION OF 2,4,4-TRIMETHYL-PENTENE-2

Boyd E. Hudson, Jr., Cranford, N. J., assignor to Standard Oil Development Company, a corporation of Delaware No Drawing. Application February 5, 1948, Serial No. 6,557

8 Claims. (Cl. 260—683.2)

This invention relates to the isomerization of mono-olefinic hydrocarbons possessing a neopentyl structure by contacting such olefinic hydrocarbons with a strong mineral-acting acid substance. More specifically, this invention is concerned with the isomerization of 2,4,4-trimethylpentene-2 to 2,4,4-trimethylpentene-1.

By the term olefin hydrocarbons possessing a neopentyl group as employed in this invention, is meant an olefin having a double-bonded carbon atom linked to a quaternary carbon atom. The following hydrocarbons possess such a structure: 3,3-dimethylbutene-1, 2,4,4-trimethylpentene-2, 2,3,4,4-tetramethylhexene-2, 3,5,5-trimethylheptene-3, etc. These hydrocarbons are cited as examples but many other olefinic hydrocarbons also possess the neopentyl structure.

It has been found that such mono-olefinic hydrocarbons possessing the neopentyl structure can be caused to undergo isomerization to shift the double bond, when other positions for it are possible, by contacting such olefinic hydrocarbons with a strong mineral-acid acting substance, e. g. surfuric acid; phosphoric acid, etc. By way of exception, 3,3-dimethylbutene-1, although possessing a neopentyl group, could not undergo this isomerization because there is no other position available for the double bond.

The invention will be illustrated by the isomerization of 2,4,4-trimethylpentene-2, a dimer of isobutylene, although it is to be understood that the invention is not limited thereto. It is well established that isobutylene can be converted to its dimer by polymerization under controlled conditions. Diisobutylene has a wide range of uses, particularly as a co-reactant in further polymerization and/or copolymerization reactions, in alkylation, and in other chemical reactions. For example, in the manufacture of certain resinous materials dimer is copolymerized with butadiene. In such a reaction the dimer, which is recovered unreacted from the process, is undesirable as a material for recycling or for further use in batch polymerization. Diisobutylene, or the dimer of isobutylene, consists essentially of two isomers, viz., 2,4,4-trimethylpentene-1 and 2,4,4-trimethylpentene-2. Of these, the 2,4,4-trimethylpentene-2 isomer is the less reactive in such reactions as mentioned above and tends to accumulate in the system as unreacted dimer.

It has been found that this unreactive dimer or 2,4,4-trimethylpentene-2 can be converted to its reactive isomer, 2,4,4-trimethylpentene-1 by contact with an aqueous solution of a strong acid, mineral or organic, or with an aqueous solution of a strong mineral acid-acting substance such as sulfuric acid, benzenesulfonic acid, phosphoric acid, acid-acting salts, e. g. $ZnSO_4$, and the like. The treatment may be applied independently, or, in conjunction with recycling in a continuous process employing dimer as a reactant. In the latter case, the unreacted dimer 2,4,4-trimethylpentene-2 recovered from the reaction zone is treated in an isomerization zone for conversion to 2,4,4-trimethylpentene-1 before recycling to the process.

The exact conditions under which the acid treatment is carried out depend, to some extent, upon practical considerations of time, temperature, acid concentration and corrosion effects. Acid concentrations vary with the acid employed. For example, sulfuric acid in the range of 50–80 wt. per cent concentration; phosphoric acid in the range of 60–85 wt. per cent concentration, and benzenesulfonic acid in the range of 60–90 wt. per cent concentration are preferred. Temperatures as low as 0° C. and as high as 150° C. are entirely practicable, provided acid strength and time of contact are suitably adjusted. With extremely vigorous agitation of the dimer and acid, contact times as short as a few minutes at elevated temperatures are desirable, particularly when acids in the upper range of concentration are employed. The effectiveness of vigorous agitation is greater at the higher temperatures and with the stronger acids. Weaker acid solutions and low temperatures require long contact times and do not necessarily reflect differences between mild and vigorous agitation. Contact times need not exceed a few hours. Volume ratios of 2,4,4-trimethylpentene-2 to acid are of the order of from 1:1 to 25:1. It should be understood that these variables are to some extent interdependent and may be adjusted to suit particular circumstances, including the overall isomerization rate. The acid contacting may, of course, be supplemented by subsequent water-washing or caustic-washing, and/or with distillation before and/or after acid treating.

The following examples are illustrative of the process of the invention. The runs are for purposes of illustration only and it is not intended to limit the invention thereto. In the runs tabulated below the dimer containing undesirably large amount of the unreactive isomer 2,4,4-trimethylpentene-2 was agitated vigorously with 65% sulfuric acid with the result that the 2,4,4- trimethylpentene-2 was largely converted to 2,4,4-trimethylpentene-1.

*Isomerization of 2,4,4-TMP-2 to 2,4,4-TMP-1*

|  | Run 1 | Run 2 |
|---|---|---|
| Temp., °C | 25 | 80 |
| Time, minutes | 30 | 15 |
| Acid used | 65% $H_2SO_4$ | 65% $H_2SO_4$ |
| Acid/Hydrocarbon, Vol. ratio | 2/1 | 2.5/1 |
| Charge Analysis Vol. Per Cent 2,4,4-TMP-1 | 46 | 46 |
| Charge Analysis Vol. Per Cent 2,4,4-TMP-2 | 33 | 33 |
| Product Analysis, vol. Per Cent 2,4,4-TMP-1 | 53 | 63 |
| Product Analysis, vol. Per Cent 2,4,4-TMP-2 | 27 | 14 |
| Conversion, Per Cent | 18 | 58 |
| Selectivity, Per Cent | (101) | 97 |

The charge stock in the above runs is considered roughly typical of recovered dimer which has been depleted in 2,4,4-trimethylpentene-1 content. Equilibrium limits the extent to which 2,4,4 - trimethylpentene - 2 can be converted to 2,4,4 - trimethylpentene - 1. At about 100° C. this equilibrium corresponds to about 82% of the 2,4,4 - trimethylpentene - 1 isomer and 2,4,4-trimethylpentene-2. The conversion in Run 2 above, viz., 58%, is nearly as high as the 82% attainable when starting with pure 2,4,4-trimethylpentene-2.

Catalysts which are effective in promoting the reaction involved in this invention are strongly acidic in character, and may be classified into two general groups, viz., mineral and organic. In the mineral classification are the mineral acids, mineral acid-acting compounds (e. g., mineral acid-acting salts), and other substances which are capable of acting as mineral acids in the presence of water or under the conditions of the reaction. Mineral acid catalysts include $H_2SO_4$, $H_3PO_4$, $HPO_3$, and the like. The following mineral acid-acting salt catalysts may be mentioned: $ZnCl_2$, $ZnSO_4$, $AlCl_3$, $Al_2(SO_4)_3$, etc.

The organic catalysts include the polybasic mineral acid-acting organic acids and their salts which are capable of giving an acid reaction under the reaction conditions of the present invention. These include the aliphatic sulfonic acids such as ethane sulfonic acid, hexane sulfonic acid, etc; the aromatic sulfonic acids, such as benzene and phenyl sulfonic acids, the alkyl sulfates, such as ethyl hydrogen sulfate, alkyl phosphoric acids, etc.

Although the invention has been illustrated by showing the isomerization of 2,4,4-trimethylpentene-2 the process may be applied to other mono-olefinic hydrocarbons possessing the neopentyl structure. For example, 2,3,4,4-tetramethylhexene - 2 may be isomerized to 2,3,4,4 - tetramethylhexene-1, or to 2-isopropyl, 3,3 - dimethylpentene-1. Similarly, 3,5,5 - trimethylheptene-3 may be converted to 3,5,5 - trimethylheptene-2, or to 2-ethyl, 4,4-dimethylhexene-1.

Having described the invention in a manner so that it may be practiced by those skilled in the art, what is claimed is:

1. A process for the shifting of the double bond from the 2 position to the 1 position, with no change in the position of the alkyl substituents of a mono-olefinic hydrocarbon having a neopentyl structure and containing alkyl substituents, which comprises contacting said olefinic hydrocarbon in the liquid phase with sulfuric acid at a temperature in the range of from 0°–150° C.

2. A process for converting 2,4,4-trimethylpentene - 2 to 2,4,4 - trimethylpentene-1 which comprises contacting 2,4,4 - trimethylpentene-2 in the liquid phase with a strong mineral acid-acting substance at a temperature in the range of from 0°–150° C.

3. A process according to claim 2 in which the strong mineral acid-acting substance is sulfuric acid.

4. A process according to claim 2 in which the strong mineral acid-acting substance is phosphoric acid.

5. A process according to claim 2 in which the strong mineral acid-acting substance is benzenesulfonic acid.

6. A process for converting 2,4,4 - trimethylpentene-2 to 2,4,4 - trimethylpentene-1 which comprises contacting 2,4,4 - trimethylpentene-2 in the liquid phase with sulfuric acid of 50 to 80 wt. percent concentration at a temperature in the range of 0° C. to 150° C.

7. A process according to claim 6 in which the 2,4,4 - trimethylpentene - 2 is contacted with 65 wt. percent sulfuric acid at a temperature of 25° C. and a contact time of 30 minutes.

8. A process according to claim 6 in which the 2,4,4 - trimethylpentene - 2 is contacted with 65 wt. percent sulfuric acid at a temperature of 80° C. and a contact time of 15 minutes.

BOYD E. HUDSON, Jr.

REFERENCES CITED

The following references are of record in the file of this patent:

UNITED STATES PATENTS

| Number | Name | Date |
|---|---|---|
| 2,217,252 | Hoog | Oct. 8, 1940 |
| 2,386,934 | Cramer | Oct. 16, 1945 |
| 2,387,994 | Hillyer | Oct. 30, 1945 |
| 2,425,340 | Nixon et al. | Aug. 12, 1947 |
| 2,454,171 | Hepp | Nov. 16, 1948 |
| 2,463,873 | Heinrich | Mar. 8, 1949 |